Feb. 13, 1940.  J. F. AUBERSCHEK  2,190,305

FLUID FILTER

Filed Dec. 15, 1938  2 Sheets-Sheet 1

Inventor
J. F. Auberschek

By
Attorneys

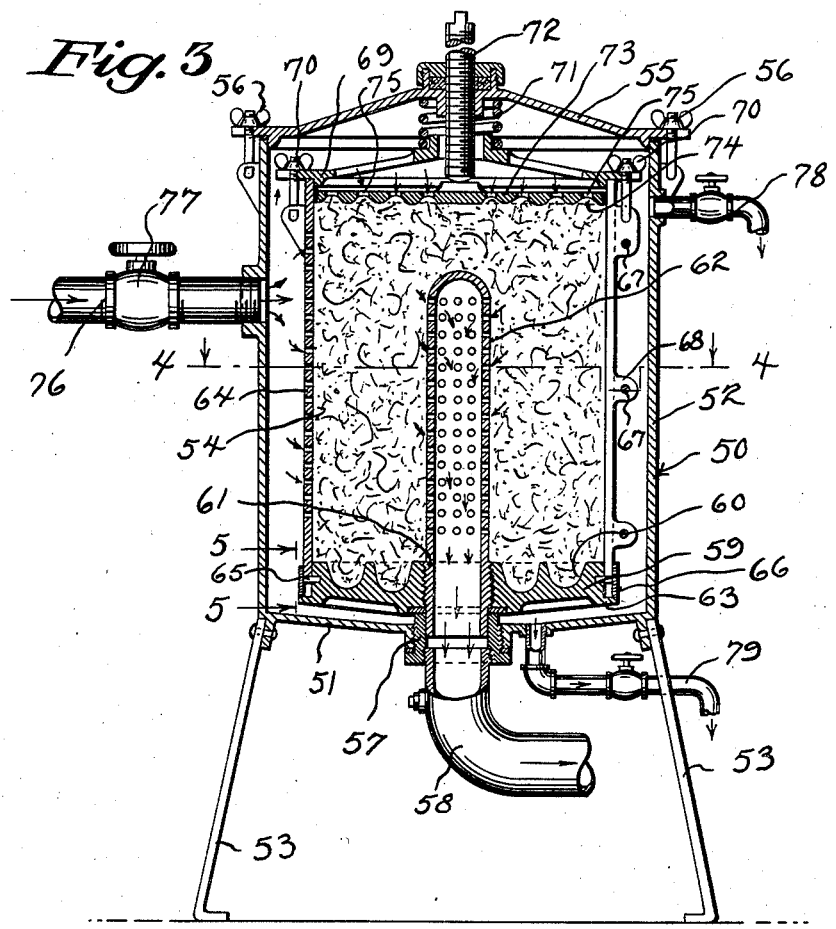
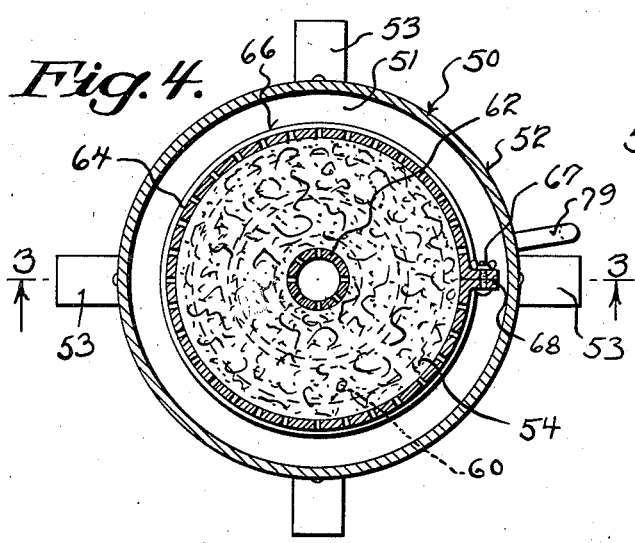

Patented Feb. 13, 1940

2,190,305

UNITED STATES PATENT OFFICE 2,190,305

FLUID FILTER

Joseph F. Auberschek, Milwaukee, Wis.

Application December 15, 1938, Serial No. 245,874

1 Claim. (Cl. 210—131)

This invention appertains to filters, and more particularly to an improved filter for fluids, such as oil, water, and the like.

One of the primary objects of my invention is to provide a filter which can be successfully used for filtering and reclaiming crank-case oil from internal combustion engines, as well as other liquids, and which embodies a novel holder for wood pulp or other filtering material, whereby such material will be held in a compact mass.

Another prime object of my invention is to provide a novel holder for the filtering material, which can be used in either gravity or pressure filters.

A further important object of my invention is to provide means for insuring the proper packing of the filter mass at the bottom of the holder and around the fluid outlet, whereby the seeping of unfiltered liquid into the outlet will be prevented.

A still further object of my invention is to provide a filter of the above character, which will be durable and efficient in use, one that will be simple and easy to manufacture, and one which can be conveniently kept in a clean condition.

With these and other objects in view, the invention consists in the novel construction, arrangement, and formation of parts, as will be hereinafter more specifically described, claimed, and illustrated in the accompanying drawings, in which drawings:

Figure 3 is a vertical, sectional view through a still further form of my invention, the view being taken substantially on the line 3—3 of Figure 4, looking in the direction of the arrows.

Figure 4 is a horizontal, sectional view through the filter shown in Figure 3, the section being taken substantially on the line 4—4 of Figure 3, looking in the direction of the arrows.

Figure 5 is a detail, fragmentary, vertical, sectional view taken on the line 5—5 of Figure 3, looking in the direction of the arrows.

Figure 1:
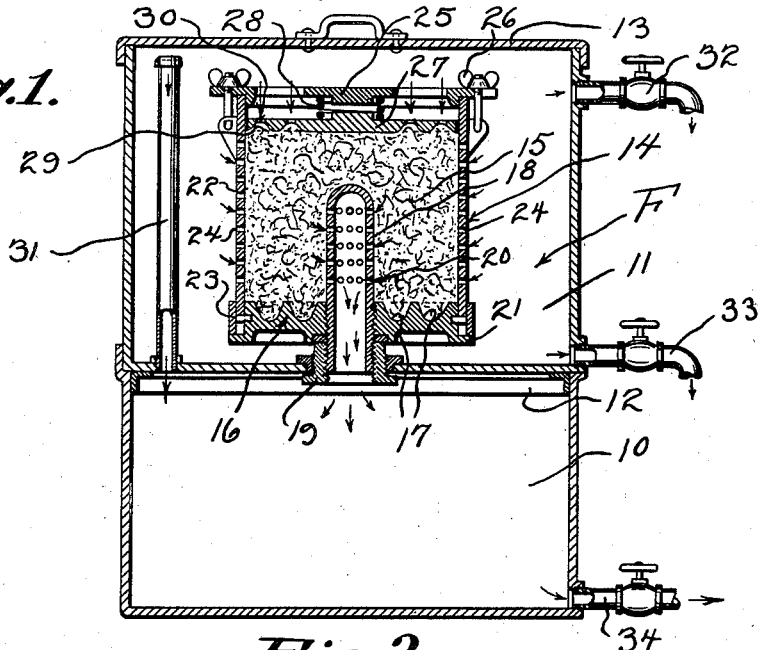
Figure 1 is a vertical, sectional view through one of my improved filters of the gravity type, and which is particularly adapted for filtering oil drained from the crank-cases of internal combustion engines.

Referring to the drawings in detail, wherein similar reference characters designate corresponding parts throughout the several views, the letter F generally indicates one form of my filter, which includes a bottom tank 10 for receiving clean, filtered liquid, and a top tank 11 for receiving the liquid to be filtered.

The tanks 10 and 11 can be of any desired size, type, or shape, and, as shown, the bottom tank 10 is flanged to form a shoulder on which the top tank can rest. If desired, an angle iron support 12 can be welded or otherwise secured to the inner surface of the tank 10 to form an additional support for the tank 11. The filter F can be of the gravity type, and, thus, the upper end of the tank 11 can be left open to permit the introduction of liquid into the same. The upper end of the tank can be closed, however, by a removable cover 13.

Located centrally within the tank 11 is the novel holder 14 for the filtering material 15. The filtering material 15 is preferably formed from loose paper pulp, although other filtering material can be used without departing from the spirit of my invention. I prefer to use the loose paper pulp, as the same can be washed clean, and the same forms an ideal means for preventing the passage of foreign matter through the same.

The holder 14 includes a base 16, which can be cast or otherwise formed, and the upper surface of the base has formed therein annular concentric channels 17. These channels 17 have tapered walls, for a purpose which will be later set forth. The base also has secured axially therein the filtering tube 18. The tube 18 protrudes below the base 16 and is adapted to be detachably secured in a neck or fitting 19 carried by the bottom wall of the tank 11. The filtering tube 18 is provided with a plurality of minute perforations 20, whereby liquid can enter the tube, but solid matter will be held back. An annular seat 21 is formed around the margin of the base 16, and this seat receives the cylindrical side wall 22 of the holder, and this side wall is detachably connected with the base in any desired way, such as through the use of a bayonet joint connection 23. Minute perforations 24 are also formed in the side wall 22, so as to permit the flow of liquid into the holder. A spider 25 is carried by the top of the side wall 22, and this spider is firmly secured to the side wall by adjustable fastening elements 26.

The holder is adapted to receive the loose paper pulp or other filtering material, and the pulp is packed tightly into the holder onto the base 16 around the filtering tube 18. To insure the proper packing of the filtering material, a relatively heavy follower plate 27 is utilized. This follower plate 27 is positioned in the holder on top of the filtering material and is continuously urged down on top of the filtering material by means of a relatively heavy expansion coil spring 28. This spring 28 is confined between the follower 27 and the spider 25. It is to be noted that the lower surface of the follower plate 27 is provided with concentric channels 29 and openings 30 communicating with the channels. This allows the flow of liquid through the follower plate into the holder.

In use of my filter, the oil or liquids to be filtered are poured into the upper tank 11, and the liquid will gradually seep through the holder and the filtering material into the tube 18, and into the receiving or bottom tank 10. The oil flowing into the bottom tank 10 will be free from impurities, as the filtering mass will effectively retain the impurities. To allow for the escape of air from the tank 10 as the oil or other liquid flows into the same, a relief pipe 31 is provided. This pipe opens out through the bottom wall of the tank 11 and terminates substantially at the upper end of the tank. The tank 11 itself can be provided adjacent its upper end with a hand-operated valve 32 for allowing the escape of air and other gases. To permit the cleaning of the tank 11, the same is provided with a draw-off valve 33 at its lower end. The filtered oil from the tank 10 can be drained from the tank by a faucet 34.

If desired, both the tank 10 and the tank 11 can be provided with any type of gauges for indicating the height of liquid therein.

After the pulp has been used a predetermined length of time, the holder 14 is removed from the tank, and the spider 25 and the follower plate 27 are taken off the holder. The filtering material is now removed therefrom, and the same will be found to be in a solid mass or cake. When this mass or cake is washed, the same will again separate into its fine pieces. Hence, the filtering material can be thoroughly cleaned in a short time with a specially designed washer. The pulp can be sterilized by boiling or steaming.

Figure 2:
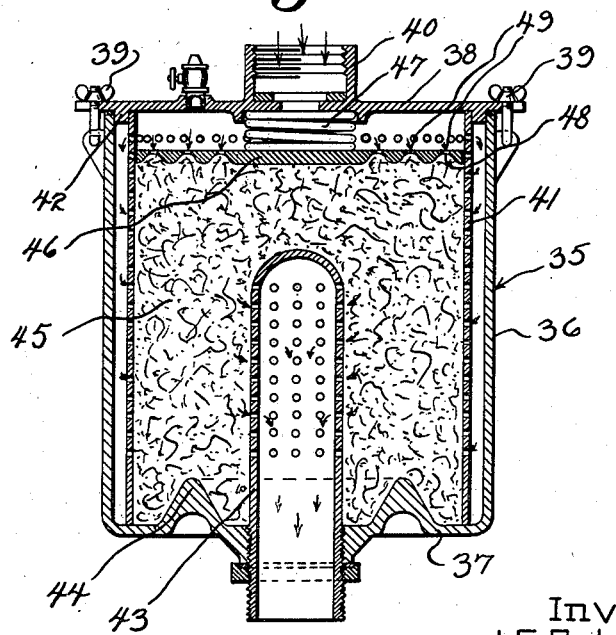
Figure 2 is an enlarged, central, vertical, sectional view through a filter constructed in accordance with my invention for use in connection with faucets.

In Figure 2, I have illustrated one type of my filter which is particularly adapted for use on water faucets. Thus, the filter shown in Figure 2 embodies a receiving vessel 35 having a side wall 36 and a bottom wall 37. The vessel is adapted to be closed by a removable top plate 38. This plate is firmly held on the vessel by the use of adjustable fastening elements 39, and the central portion of the plate is provided with a threaded neck 40 for connection with a faucet. Arranged within the vessel 35 is a perforated screen 41, and this screen 41 is placed in slightly spaced relation to the side wall 36. The cover plate 38 has formed thereon a depending rib 42, which extends between the screen 41 and the wall 36, so as to insure the proper spacing of the screen from the side wall.

Extending axially into the vessel through the bottom wall 37 thereof is the filtering tube 43, and the filtering tube 43 extends below the vessel and can be threaded so that a hose can be connected thereto, if such should be desired. Likewise, the bottom wall 37 has formed thereon around the filtering tube 38 an annular rib 44. This rib is of a substantial V-shape in cross-section, and the purpose of the same will hereinafter more fully appear. The top wall can be provided with an air or vapor relief valve.

The filtering pulp 45 or other material is packed into the vessel around the tube 43 and within the perforated screen or sleeve 41, and after the pulp has been placed in position, the same is held under pressure by the follower plate 46. The follower plate 46 is normally urged downwardly by means of an expansion coil spring 47, which is confined between the follower plate and the cover plate 38. It is also to be noted that the follower plate 46 has formed in its lower surface a plurality of concentric channels 48, and these channels have communicating therewith perforations 49, whereby liquid can flow past the plate through the filtering material. By having the rib 44 in the filter, the filtering material is spread at the bottom of the filter and is forced tightly against the tube 43 and the screen. Thus, liquid will be prevented from seeping past at this point in an unfiltered condition. Obviously, the walls of the channels 17 in the base 16 perform the same function for the filter shown in Figure 1.

In Figures 3, 4, and 5, I have illustrated one of my filters of the tank type, which filter is more or less operated by liquid pressure. Thus, the filter shown in Figures 3, 4, and 5 embodies a receiving tank 50, which includes a bottom wall 51 and a side wall 52. The tank can be supported in an elevated position in any desired manner, such as through the medium of legs or standards 53.

The tank 50 is adapted to receive the novel holder 54, which is arranged in spaced relation to the walls of the tank. The tank 50 is provided with a removable cover plate 55, which is firmly held on by removable, adjustable fastening members 56. The bottom of the tank at its axial center is provided with a fitting or sleeve 57 for receiving a pipe 58, which is utilized for conducting filtered liquid from the holder.

The holder 54 is formed similar to the filter shown in Figure 2, and to the holder 14 shown in Figure 1, and, hence, the holder 54 includes a base plate 59 having annular concentric channels 60 formed in its upper face and around the axial opening 61. The opening 61 has fitted therein the filtering tube 62, and this tube extends below the base 59 for liquid-tight connection with the leg or fitting 57. The filter tube 62 has formed therein a plurality of minute perforations to allow the seeping of filtered liquid therein. A marginal flange 63 is formed on the base, and the perforated screen or side wall 64 of the holder is adapted to rest on the flange. The side wall can be connected to the base by bayonet joint connection 65, clearly shown in Figure 5 of the drawings. If desired, a band 66 can be placed around the side wall 64 and on the flange 63, so as to cover the pins and slots of the bayonet joint 65.

As illustrated in Figure 3, the side wall 64 can be of a split construction, and the side wall at the split can be connected by bolts 67 passing through ears 68 formed on the side wall. The upper end of the side wall carries a spider 69, and the spider is firmly connected to the said side wall by removable and adjustable fastening elements 70. The spider and the top wall 55 have interposed therebetween an expansion spring 71, and this spring functions to place pressure upon the holder, so that the same will be firmly held within the tank. The top wall of the tank carries a screw 72, and this screw extends through the spider 69, and into engagement with a follower plate 73, which is arranged on top of the filtering pulp disposed within the holder. The filtering pulp is packed within the holder, after which the follower is placed in position and the other parts of the device are assembled. After assembling, the screw 72 can be tightened so as to urge the follower plate down tight on the pulp, to cause the tight packing of the pulp within the holder.

The follower plate 73 is of the type shown in Figures 1 and 2, and, hence, the lower face of the same is provided with a plurality of concentric channels 74, and these channels have communicating therewith perforations 75. Obviously, liquid can flow into the filtering material, through the perforations in the screen 64, and the follower plate 73.

The liquid to be filtered is forced under pressure into the tank through the pipe 76, and this liquid will gradually be forced through the filtering material and into the tube 62, and out of the pipe 53. A hand-operated control valve 77 can be placed within the length of the pipe 76, so as to control the flow of liquid through the pipe. The tank 50 adjacent its upper end is provided with a relief valve 78, and the tank adjacent its lower end is provided with a draw-pipe 79, which permits the washing of the tank and the drawing off of undesired material from the tank.

From the foregoing, it can be seen that I have provided an exceptionally simple and durable form of filter, in which loose flocculent material, such as paper pulp, can be successfully used as the filtering medium.

Changes in details may be made without departing from the spirit or the scope of my invention, but what I claim as new is:

In a filter, a tank for receiving the liquid to be filtered, a holder disposed in the tank including, a base plate, a perforated side wall connected to the base plate, and a spider carried by the top of the side wall, a perforated filtering tube extending into the holder through the base for connection with the bottom wall of the tank, loose filtering material packed in said holder, a follower in said holder, and means normally urging the follower into engagement with the filtering material, the spider and follower coacting to normally urge the filtering material toward the base plate, said base plate having concentric channels around the filtering tube, as and for the purpose specified.

JOSEPH F. AUBERSCHEK.